United States Patent
Park et al.

(10) Patent No.: US 10,054,726 B2
(45) Date of Patent: *Aug. 21, 2018

(54) POLARIZING PLATE AND LIQUID CRYSTAL DISPLAY COMPRISING THE SAME

(75) Inventors: In Kyu Park, Daejeon (KR); Ki Ok Kwon, Daejeon (KR); No Ma Kim, Daejeon (KR); In Ho Hwang, Daejeon (KR); Sung Hyun Nam, Daejeon (KR); Sung Soo Yoon, Daejeon (KR); Kyun Il Rah, Daejeon (KR); Min Ki Lee, Daejeon (KR)

(73) Assignee: LG Chem, Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/580,354

(22) PCT Filed: Feb. 28, 2011

(86) PCT No.: PCT/KR2011/001404
§ 371 (c)(1),
(2), (4) Date: Aug. 21, 2012

(87) PCT Pub. No.: WO2011/105876
PCT Pub. Date: Sep. 1, 2011

(65) Prior Publication Data
US 2012/0314161 A1    Dec. 13, 2012

(30) Foreign Application Priority Data

Feb. 26, 2010  (KR) ................. 10-2010-0017670
Feb. 28, 2011  (KR) ................. 10-2011-0018051

(51) Int. Cl.
*G02F 1/1335*    (2006.01)
*G02B 5/30*    (2006.01)
(Continued)

(52) U.S. Cl.
CPC ...... *G02B 5/3041* (2013.01); *B32B 2457/202* (2013.01); *C09J 133/068* (2013.01);
(Continued)

(58) Field of Classification Search
CPC ........ C09J 2433/00; C09J 7/00; C09J 133/00; C09J 133/08; C09J 133/10; C09J 133/12;
(Continued)

(56) References Cited

U.S. PATENT DOCUMENTS 6,074,729 A * 6/2000 Watanabe ............. C09J 7/0246
428/212
6,416,858 B1 * 7/2002 Ercillo et al. ................. 428/345
(Continued)

FOREIGN PATENT DOCUMENTS

JP     10-044292       2/1998
JP     H 10044292 A *  2/1998  ............. B32B 7/10
(Continued)

OTHER PUBLICATIONS

Suzuki et al., JP 2009205141, English Translation from http://dossier1.ipdl.inpit.go.jp/AIPN/odse_top_dn.ipdl?N0000=7400.*
(Continued)

*Primary Examiner* — Eli D. Strah
(74) *Attorney, Agent, or Firm* — Dentons US LLP

(57) ABSTRACT

Provided are a polarizing plate and a liquid crystal display device. The polarizing plate, which is lightweight and has a thin thickness and excellent physical properties including durability, water resistance, workability, pressure-sensitive adhesion and a light leakage prevention effect; and the liquid crystal display device including the same are provided.

9 Claims, 2 Drawing Sheets

(51) Int. Cl.
  *C09J 133/06* (2006.01)
  *C09J 133/08* (2006.01)
  *C09J 133/10* (2006.01)
  *C09J 133/12* (2006.01)
(52) U.S. Cl.
  CPC ............ *C09J 133/08* (2013.01); *C09J 133/10* (2013.01); *C09J 133/12* (2013.01); *C09J 2201/60* (2013.01); *G02B 5/305* (2013.01); *Y10T 428/1041* (2015.01); *Y10T 428/1059* (2015.01); *Y10T 428/1077* (2015.01)
(58) Field of Classification Search
  CPC ............... C09J 2201/00; C09J 2201/02; C09J 2203/326; C09J 133/068; C09J 2201/60; G02F 1/133345; G02F 2001/1533; G02F 2001/1536; G02F 2202/28; B32B 17/10743; B32B 27/00; B32B 27/04; B32B 27/06; B32B 27/08; B32B 27/16; B32B 7/12; B32B 2457/202; G02B 5/3041; G02B 5/305; Y10T 428/1036; Y10T 428/1041; Y10T 428/105; Y10T 428/1059; Y10T 428/1077; Y10T 428/1082
  USPC .......... 156/106, 247; 349/96–103, 122–138; 427/207.1, 208, 208.4, 208.6, 208.8; 428/1.1, 1.3, 1.5, 355 R, 355 EN, 355 BL, 428/355 AC, 356; 524/236, 356, 555, 524/556; 525/329.9, 330.5; 526/931
  See application file for complete search history.

(56) References Cited

U.S. PATENT DOCUMENTS

| | | | | |
|---|---|---|---|---|
| 9,256,005 | B2* | 2/2016 | Huh .................... | G02B 5/3033 |
| 2004/0191509 | A1* | 9/2004 | Kishioka et al. ............ | 428/354 |
| 2006/0099411 | A1* | 5/2006 | Xia ......................... | B32B 7/005 |
| | | | | 428/343 |
| 2006/0128925 | A1* | 6/2006 | Arai ................... | C08G 18/6254 |
| | | | | 528/44 |
| 2007/0148485 | A1* | 6/2007 | Kusama ................ | C09J 133/08 |
| | | | | 428/520 |
| 2007/0267133 | A1* | 11/2007 | Matano et al. ............ | 156/272.2 |
| 2008/0220251 | A1* | 9/2008 | Takaki ......................... | 428/345 |
| 2009/0162617 | A1* | 6/2009 | Moroishi ............. | G02B 5/0242 |
| | | | | 428/172 |
| 2011/0007244 | A1* | 1/2011 | Kim et al. ...................... | 349/96 |
| 2011/0043733 | A1* | 2/2011 | Suzuki .................. | C09J 135/04 |
| | | | | 349/96 |
| 2011/0149211 | A1* | 6/2011 | Ha et al. ......................... | 349/96 |
| 2012/0314160 | A1* | 12/2012 | Hwang et al. .................. | 349/96 |
| 2014/0168580 | A1* | 6/2014 | Huh et al. ....................... | 349/96 |
| 2014/0204317 | A1* | 7/2014 | Huh et al. ....................... | 349/96 |
| 2014/0240647 | A1* | 8/2014 | Huh et al. ....................... | 349/96 |

FOREIGN PATENT DOCUMENTS

| | | | | |
|---|---|---|---|---|
| JP | 2001-294828 | | 10/2001 | |
| JP | 2002-014226 | A | 1/2002 | |
| JP | 2004-226759 | A | 8/2004 | |
| JP | 2006-063189 | A | 3/2006 | |
| JP | 2006299053 | A * | 11/2006 | ............... C09J 7/00 |
| JP | 2008-158181 | A | 7/2008 | |
| JP | 2008-165199 | A | 7/2008 | |
| JP | 2009-205141 | | 9/2009 | |
| JP | 2009-205141 | A | 9/2009 | |
| JP | WO 2009145150 | A1 * | 12/2009 | ............ C09J 135/04 |
| JP | 2013-520705 | A | 6/2013 | |
| KR | 10-1997-0007403 | | 2/1997 | |
| KR | 10-2009-0077648 | | 7/2009 | |
| TW | 201007205 | A1 | 2/2010 | |
| TW | 201007229 | A1 | 2/2012 | |
| WO | 2009-088205 | A3 | 7/2009 | |
| WO | WO 2009088205 | A2 * | 7/2009 | ............... G02B 1/11 |
| WO | WO 2010021505 | A2 * | 2/2010 | ............ C09J 133/08 |

OTHER PUBLICATIONS

"Surface" Definition, Dictionary.com, http://dictionary.reference.com/browse/surface.*

Kamath et al., The Determination of Polymer Relaxation Moduli and Memory Functions Using Integral Transforms, 1989, Journal of Non-Newtonian Fluid Mechanics, 32, 119-144.*

* cited by examiner

POLARIZING PLATE AND LIQUID CRYSTAL DISPLAY COMPRISING THE SAME

This application is a National Stage Entry of International Application No. PCT/KR2011/001404, filed Feb. 28, 2011, and claims the benefit of Korean Application Nos. 10-2010-0017670, filed on Feb. 26, 2010, and 10-2011-0018051, filed on Feb. 28, 2011, which are hereby incorporated by reference in their entirety for all purposes as if fully set forth herein.

TECHNICAL FIELD

The present invention relates to a polarizing plate and a liquid crystal display device.

BACKGROUND ART

A liquid crystal display (LCD) device is applied in various fields because it has low power consumption and can be formed in a thin plane.

The LCD device includes a liquid crystal panel including a liquid crystal present between transparent substrates and polarizing plates attached to both surfaces of the liquid crystal panel.

The polarizing plate generally has a structure shown in FIG. 1. That is, the polarizing plate 1 may include a polarizer 11, and protective films 12a and 12b attached to both surfaces of the polarizer 11. Also, the polarizing plate 1 may include a pressure-sensitive adhesive layer 13 formed under the protective film 12b and may be used to attach to a liquid crystal panel, and may further include a releasing film 14 formed under the pressure-sensitive adhesive layer 13. Although not shown in FIG. 1, the polarizing plate may include an additional functional film such as an anti-reflection film.

In such a structure of the conventional polarizing plate, to provide a device having a smaller thickness and light weight, for example, as described in patent reference No. 1, there have been attempts to form the polarizing plate while omitting one of the protective films 12a and 12b formed on both surfaces of the conventional polarizer 11. However, it is difficult to provide a polarizing plate with desired performance without using a protective film.

PRIOR ART REFERENCES

Patent References

[Patent Reference No. 1] JP Publication of patent application No. 2002-014226

DISCLOSURE

Technical Problem

The present invention is directed to a polarizing plate and a liquid crystal display device.

Technical Solution

The present invention relates to a polarizing plate including: a polarizer, an adhesive layer directly attached to at least one surface of the polarizer and having a thickness of 10 to 600 nm, and a pressure-sensitive adhesive layer directly attached to the adhesive layer and having a thickness of 10 to 80 μm.

Hereinafter, the polarizing plate of the present invention will be described in further detail.

The polarizing plate of the present invention includes an adhesive layer and a pressure-sensitive adhesive layer, which are sequentially formed on at least one surface of the polarizer.

In the present invention, the adhesive layer is directly attached to one surface of the polarizer, and the pressure-sensitive adhesive layer is directly attached to the adhesive layer. The term "B directly attached to A" or "B directly attached to an upper or lower surface of A" means that B is directly attached to a surface of A without a different layer therebetween, that is, there is no layer between A and B. In one example, the expression "a polarizing plate including an adhesive layer directly formed on one surface of a polarizer and a pressure-sensitive adhesive layer directly formed on one surface of the adhesive layer" may mean a conventional polarizing plate which does not have a protective film attached to a polarizer, and includes an adhesive layer and a pressure-sensitive adhesive layer, which are sequentially formed.

That is, at least one surface of the polarizer may not have a protective film, and the adhesive layer may be attached to a surface of the polarizer to which no protective film is attached. In addition, the pressure-sensitive adhesive layer directly attached to the adhesive layer may function to attach the polarizing plate to a liquid crystal display panel.

FIG. 2 is a diagram illustrating an exemplary polarizing plate 2 according to an exemplary embodiment of the present invention. As shown in FIG. 2, the polarizing plate 2 of the present invention may include a polarizer 21; and an adhesive layer 22 and a pressure-sensitive adhesive layer 23, which are sequentially formed.

A polarizer is a functional film or sheet capable of extracting light vibrating in only one direction from incident light vibrating in various directions. As a polarizer, a conventional polarizer such as a polyvinyl alcohol-based polarizer may be used. Such a polarizer may be a type in which a dichroic dye is aligned with a polyvinyl alcohol-based resin film through adsorption. The polyvinyl alcohol-based resin constituting the polarizer may be obtained, for example, by forming a polyvinyl acetate-based resin into a gel. As the polyvinylacetate-based resin, a homopolymer of vinyl acetate; and a copolymer of vinyl acetate and another monomer copolymerizable with the vinyl acetate, may be used. Examples of the monomer co-polymerizable with vinyl acetate may include, but are not limited to, one or a mixture of at least two unsaturated carboxylic acids, olefins, vinyl ethers, unsaturated sulfonic acids and acrylamides having an ammonium group. The gelling degree of the polyvinyl alcohol-based resin may generally be 85 to 100 mol %, and preferably 98 mol % or more. The polyvinyl alcohol-based resin may be further modified, and may be, for example, polyvinyl formal or polyvinyl acetal modified with aldehydes. Furthermore, the degree of polymerization of the polyvinyl alcohol-based resin may be approximately 1000 to 10000, and preferably 1500 to 5000.

The polarizer is formed of a hydrophilic resin such as polyvinyl alcohol, and thus is generally vulnerable to moisture. The polarizer is also formed through an stretching process, and thus easily shrinks in moist conditions, resulting in degradation of optical characteristics of the polarizing plate. Accordingly, in order to solve such a problem, it is common in a structure of the conventional polarizing plate to form protective films, such as TAC films, on both surfaces of the polarizer to reinforce the strength of the polarizer, as shown in FIG. 1. When a protective film is not used, due to a low dimensional stability of the polarizer, the polarizing plate's durability or optical properties and particularly water resistance are diminished.

In the present invention, according to the structure in which the adhesive layer and the pressure-sensitive adhesive layer are continuously formed instead of a protective film attached to one surface of the polarizer, problems caused by the removal of the protective film may be resolved. When the protective film is removed, a thinner and lighter polarizing plate may be provided. Such a polarizing plate may be referred to as a thin polarizing plate throughout the specification.

The adhesive layer has a major role of securing the physical properties of the polarizing plate even when the protective film of the polarizer is omitted. In a polarizing plate according to one example, as will be described later, the pressure-sensitive adhesive layer may have first and second surfaces, in which the first surface may have a higher tensile modulus than the second surface, and may be attached to the adhesive layer. In this case, the first surface has a lower peeling force than the second surface, and thus cohesive strength between a pressure-sensitive adhesive and the polarizer is degraded. As a result, it is possible to degrade the physical properties of the polarizing plate. However, since an adhesive is disposed between the polarizer and the pressure-sensitive adhesive, due to the original characteristic of the adhesive, the surface of the pressure-sensitive adhesive layer, specifically the first surface, may expand, a roughness of the surface is increased, and the adhesive penetrates into the pressure-sensitive adhesive. Accordingly, the polarizing plate which ensures cohesion to the polarizer and has excellent physical properties may be provided.

In the present invention, the adhesive layer may have a thickness of 10 to 600 nm, preferably, 15 to 500 nm, and more preferably, 15 to 450 nm. When the thickness of the adhesive layer is controlled to be 10 nm or more, the water resistance of the polarizing plate may be excellently maintained, and when the thickness of the adhesive layer is controlled to be 600 nm or less, a uniform adhesive layer may be formed.

The adhesive layer may be formed, for example, by coating an adhesive composition on one surface of the polarizer, and curing the composition by drying, heating or irradiating electromagnetic waves. Herein, the term "curing" refers to a process for expressing an adhesive characteristic of the adhesive composition by a physical action or chemical reaction.

A specific kind to be used as an adhesive layer is not specifically limited, and thus any one which may be cured to express a desired adhesive characteristic may be used. For example, the adhesive layer may be any of a polyvinyl alcohol-based adhesive; an acryl-based adhesive; a vinyl acetate-based adhesive; a urethane-based adhesive; a polyester-based adhesive; a polyolefin-based adhesive; a polyvinyl alkylether-based adhesive; a rubber-based adhesive; a chlorovinyl-vinylacetate-based adhesive; a styrene-butadiene-styrene (SBS) adhesive; a hydrogenated styrene-butadiene-styrene (SEBS)-based adhesive; an ethylene-based adhesive; and an acrylic acid ester-based adhesive, which are used alone or in combination of at least two thereof. The adhesive layer may be formed, for example, by curing a water-based, solvent-based, or non-solvent-based adhesive composition. The adhesive layer may also include a thermocurable, room temperature curable, moisture curable or photocurable adhesive composition in a cured state. Exemplary examples of the adhesive layers may include a water-based polyvinyl alcohol-based adhesive composition, a non-solvent acryl-based adhesive composition, and a non-solvent vinyl acetate-based adhesive composition in a cured state.

In one example, the pressure-sensitive adhesive layer attached to the lower surface of the adhesive layer may have different tensile moduli on either surface thereof. In other words, in one example, the pressure-sensitive adhesive layer may have first and second surfaces, in which the first surface may have a higher tensile modulus than the second surface. In this example, the first surface may be directly attached to the adhesive layer. In this case, the second surface may also constitute a pressure-sensitive adhesive surface for attaching the polarizing plate to the liquid crystal panel.

FIG. 3 illustrates a pressure-sensitive adhesive layer 3 having first and second surfaces 31 and 32.

When the first surface of the pressure-sensitive adhesive layer attached to the polarizer is designed to have a high tensile modulus, contraction or expansion of the polarizer under severe conditions including high temperature or high humidity may be inhibited. In addition, when the second surface attaching the polarizing plate to a glass substrate of the liquid crystal panel is designed to have a low tensile modulus, the polarizer may have excellent wettability to an adherent.

In one example, the first surface may have a tensile modulus at 25° C. of 1 to 1000 MPa, preferably 10 to 800 MPa, and more preferably, 100 to 500 MPa. In another example, the second surface may have a tensile modulus at 25° C. of 0.01 to 0.5 MPa, preferably 0.02 to 0.3 MPa, and more preferably 0.03 to 0.2 MPa. When the tensile moduli of the first and second surfaces are controlled within the above-mentioned range, respectively, the pressure-sensitive adhesive layer may effectively inhibit the contraction or expansion of the polarizer under severe conditions, and have excellent wettability to the adherent such as a glass substrate.

A method of forming a pressure-sensitive adhesive layer having different tensile moduli on either surface thereof is not particularly limited. For example, when the pressure-sensitive adhesive layer is formed in a single layer structure, the difference in physical properties of the surfaces may be accomplished, for example, by controlling the pressure-sensitive adhesive layer so that a gradient in the degree of curing can be formed in the thickness direction of the pressure-sensitive adhesive layer. Such a method is particularly suitable for a photocurable pressure-sensitive adhesive composition constituting the pressure sensitive adhesive layer. For example, for a composition cured by the irradiation of UV rays, when the thickness of a coating layer of the composition before the irradiation of UV rays or an amount of irradiated UV rays is controlled, or when the UV rays are irradiated into the composition having a suitable amount of a UV absorber or a UV absorbing functional group, while propagating in the thickness direction of the coating layer, the UV rays are absorbed into the coating layer, and thus a gradient in the amount of irradiated UV rays is formed according to the pathway. According to the gradient formed as described above, the degree of curing of the coating layer may be changed, and thereby the pressure-sensitive adhesive layer having different properties on the surfaces thereof may be implemented. In another example, the pressure-sensitive adhesive layer may be formed as a multiple structure including at least two pressure-sensitive adhesive layers having different tensile moduli.

For example, as shown in FIG. 4, the pressure-sensitive adhesive layer 4 may include a first pressure-sensitive adhesive layer 41 forming a first surface 31, and a second pressure-sensitive adhesive layer 42 forming a second surface 32. When the pressure-sensitive adhesive layers 41 and 42 are controlled to have different tensile moduli, both surfaces of the pressure-sensitive adhesive layer having different tensile moduli may be implemented. The pressure-sensitive adhesive layer may be formed in a multi-layered structure, for example, a double-layered structure shown in FIG. 4 or a triple-layered structure in some cases, and preferably a double-layered structure in consideration of the efficiency of the thin polarizing plate.

The pressure-sensitive adhesive layer may have a total thickness of approximately 10 to 80 μm, preferably 20 to 60 μm, and more preferably 30 to 60 μm. When the total thickness of the pressure-sensitive adhesive layer is controlled as described above, the polarizing plate having a thin thickness and excellent physical properties such as durability under severe conditions may be provided. When the pressure-sensitive adhesive layer is formed in a double-layered structure shown in FIG. 4, the first pressure-sensitive adhesive layer may have a thickness of 4 to 50 μm, and the second pressure-sensitive adhesive layer may have a thickness of 5 to 50 μm. When the thickness of the first pressure-sensitive adhesive layer is controlled in a range of 4 to 50 μm, the contraction or expansion of the polarizer may be effectively prevented. When the thickness of the second pressure-sensitive adhesive layer is controlled in a range of 5 to 50 μm, the wettability of the pressure-sensitive adhesive layer or the durability of the polarizing plate may be effectively maintained. When the pressure-sensitive adhesive layer is formed in a multi-layered structure, the sum of the thicknesses may satisfy the above-mentioned range of the total thickness.

In the present invention, a method of forming the pressure-sensitive adhesive layer is not specifically limited. For example, the pressure-sensitive adhesive layer may be formed by curing a conventional room temperature curable, moisture curable, thermocurable, or photocurable pressure-sensitive adhesive composition. To implement a multi-layered pressure-sensitive adhesive layer, two kinds of pressure-sensitive adhesive layers may be sequentially formed, or independently formed and then laminated.

In one example, when the pressure-sensitive adhesive layer is formed in a multi-layered structure, the pressure-sensitive adhesive layer disposed on the polarizer, for example, the first pressure-sensitive adhesive layer in the double-layered structure, may be formed of a photocurable pressure-sensitive adhesive composition, but the present invention is not limited thereto. The term "photocurable pressure-sensitive adhesive composition" may be referred to as a pressure-sensitive adhesive composition which can be cured due to the induction of a crosslinking or polymerization reaction by irradiating electromagnetic waves such as UV rays or electron beams.

In one example, the pressure-sensitive adhesive layer may include an interpenetrating polymer network (referred to as an "IPN"). The term "IPN" may indicate a state in which at least two kinds of crosslinking structures are present in a pressure-sensitive adhesive layer, and in one example, the crosslinking structure may be present in an entanglement, linking or penetrating state. When the pressure-sensitive adhesive layer includes the IPN, a polarizing plate having excellent durability, workability, optical characteristics and light leakage prevention ability in severe conditions may be implemented.

When the pressure-sensitive adhesive layer includes the IPN structure, the pressure-sensitive adhesive layer may include a crosslinking structure of an acryl polymer crosslinked by a multifunctional crosslinking agent and a crosslinking structure of a polymerized multifunctional acrylate.

For example, the acryl polymer crosslinked by the multifunctional crosslinking agent may have a weight average molecular weight ($M_w$) of 500000 or more. The weight average molecular weight is a converted figure for standard polystyrene measured by gel permeation chromatography (GPC). Herein, unless specifically defined otherwise, the term "molecular weight" indicates "weight average molecular weight." When the molecular weight of the polymer is set at 500000 or more, it is possible to form a pressure-sensitive adhesive layer having excellent durability in severe conditions. The upper limit of the molecular weight is not particularly limited, and may be, for example, controlled in a range of 2500000 or less in consideration of the durability of the adhesive or coatability of the composition.

In one example, the acryl resin may be a polymer including a (meth)acrylic acid ester-based monomer as a polymerization unit.

As the (meth)acrylic acid ester-based monomer, alkyl (meth)acrylate may be used, and in consideration of cohesive strength, glass transition temperature or pressure-sensitive adhesion of the pressure-sensitive adhesive, alkyl (meth)acrylate including an alkyl group having 1 to 14 carbon atoms may be used. Examples of such monomers may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth) acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate, which may be used alone or in combination of at least two thereof.

The polymer may further include a crosslinkable monomer as a polymerization unit, and preferably, the polymer includes 50 to 99.9 parts by weight of the (meth)acrylic acid ester-based monomer and 0.1 to 50 parts by weight of the crosslinkable monomer, which are polymerized. Herein, the "crosslinkable monomer" refers to a monomer which may be copolymerized with the (meth)acrylic acid ester-based monomer, and provide a crosslinkable functional group to a side chain or end of the polymer after copolymerization. Herein, unless specifically described otherwise, the unit "part(s) by weight" refers to a ratio of weight. A weight ratio of monomers included in a polymer is controlled as mentioned above, and thus a pressure-sensitive adhesive having excellent early adhesion or durability can be provided.

The crosslinkable monomer may function to control the durability, pressure-sensitive adhesion, and cohesion of the pressure-sensitive adhesive. For example, the crosslinkable monomer may provide a hydroxyl group, a carboxyl group, an epoxy group, an isocyanate group or a nitrogen-containing functional group such as an amino group to the polymer. The crosslinkable monomer may also be copolymerized with the (meth)acrylic acid ester-based monomer. Various monomers serving as such are known in the art, and all of the monomers described above may be used herein. Examples of the crosslinkable monomers may include, but are not limited to, a hydroxy-containing monomer such as 2-hydroxyethyl (meth)acrylate, 2-hydroxypropyl (meth) acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate; a carboxyl-containing monomer such as (meth)acrylic acid, 2-(meth)acryloyloxy acetic acid, 3-(meth)acryloyloxy propionic acid, 4-(meth)acryloyloxy butyric acid, an acrylic acid dimer, an itaconic acid, a maleic acid and a maleic acid anhydride; and a nitrogen-containing monomer such as (meth)acrylamide, N-vinyl pyrrolidone or N-vinyl caprolactame, which may be used alone or in combination of at least two thereof.

The acryl resin may further include a monomer of Formula 1 as a polymerization unit.

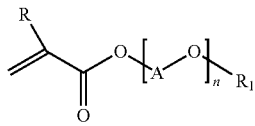

[Formula 1]

In Formula 1, R is hydrogen or an alkyl group, A is alkylene, $R_1$ is an alkyl or aryl group, and n is a number from 1 to 6.

In the definition of the substituents of Formula 1, the alkyl group may be a linear, branched, or cyclic alkyl group having 1 to 20, 1 to 16, 1 to 12, 1 to 8, or 1 to 4 carbon atoms, the alkylene may be linear, branched or cyclic alkylene having 1 to 20, 1 to 16, 1 to 12, 1 to 8 or 1 to 4 carbon atoms, and the aryl group may be an aryl group having 6 to 20 or 6 to 12 carbon atoms, for example, a phenyl group.

The monomer of Formula 1 may be present in an amount of 50 parts by weight or less with respect to the above-mentioned weight ratio of the (meth)acrylic acid ester-based monomer or crosslinkable monomer, which however may be changed according to its purpose.

The acryl resin may be further included while being polymerized with a monomer of Formula 2, when necessary. Such a monomer may serve to control the glass transition temperature and to provide other functionalities.

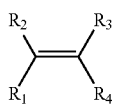

[Formula 2]

In Formula 2, $R_1$ to $R_3$ are each independently a hydrogen or an alkyl group, $R_4$ is cyano; an alkyl-substituted or unsubstituted phenyl group; an acetyloxy group; or $COR_5$. Here, $R_5$ is an alkyl- or alkoxyalkyl-substituted or unsubstituted amino or glycidyloxy group.

In the definitions of $R_1$ to $R_5$ of Formula 2, an alkyl or alkoxy group refers to an alkyl or alkoxy group having 1 to 8 carbon atoms, and preferably a methyl, ethyl, methoxy, ethoxy, propoxy or butoxy group.

The monomer of Formula 2 may be contained at up to 20 parts by weight with respect to the weight of the (meth) acrylic acid ester-based monomer or crosslinkable monomer, but the weight may be changed according to its purpose.

The acryl resin may be prepared of a mixture of monomers having the above-mentioned components by conventional polymerization methods such as solution polymerization, photopolymerization, bulk polymerization, suspension polymerization or emulsion polymerization.

A multifunctional crosslinking agent capable of crosslinking such an acryl resin in the adhesive layer may be, but is not limited to, a common crosslinking agent such as an isocyanate crosslinking agent, an epoxy crosslinking agent, an aziridine crosslinking agent, or a metal chelate crosslinking agent, and preferably an isocyanate crosslinking agent. The isocyanate crosslinking agent may be a multifunctional isocyanate compound such as tolylene diisocyanate, xylene diisocyanate, diphenylmethane diisocyanate, hexamethylene diisocyanate, isophoron diisocyanate, tetramethylxylene diisocyanate or naphthalene diisocyanate, or a compound obtained by reaction of the multifunctional isocyanate compound with a polyol compound such as trimethylol propane. The epoxy crosslinking agent may include at least one selected from the group consisting of ethyleneglycol diglycidylether, triglycidylether, trimethylolpropane triglycidylether, N,N,N',N'-tetraglycidyl ethylenediamine and glycerin diglycidylether. The aziridine crosslinking agent may include at least one selected from the group consisting of, but not limited to, N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) and tri-1-aziridinyl phosphine oxide. In addition, the metal chelate crosslinking agent may be, but is not limited to, a compound in which a polyvalent metal such as aluminum, iron, zinc, tin, titanium, antimony, magnesium and/or vanadium is coordinated with acetyl acetone or ethyl acetoacetate.

In the pressure-sensitive adhesive, such a multifunctional crosslinking agent may be present in an amount of 0.01 to 10 parts by weight, and preferably 0.01 to 5 parts by weight with respect to 100 parts by weight of the above-mentioned acryl resin. In such a range, the pressure-sensitive adhesive may maintain excellent cohesion or durability.

The multifunctional crosslinking agent may crosslink the polymer by reaction with a crosslinkable functional group of the acryl resin during the formation of the pressure-sensitive adhesive layer, for example, an aging process.

The IPN-structured pressure-sensitive adhesive layer may include a crosslinking structure implemented by an acryl resin crosslinked by the multifunctional crosslinking agent and a crosslinking structure by a polymerized multifunctional acrylate.

The multifunctional acrylate may be a compound having at least two (meth)acryloyl groups in the molecule, and may be used without limitation. Examples of the multifunctional acrylate to be used herein may include, but are not limited to: bifunctional acrylates such as 1,4-butanediol di(meth) acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth) acrylate, caprolactone-modified dicyclopentenyl di(meth) acrylate, ethyleneoxide-modified di(meth)acrylate, di(meth) acryloxy ethyl isocyanurate, allylated cyclohexyl di(meth) acrylate, tricyclodecane dimethanol(meth)acrylate, dimethylol dicyclopentane di(meth)acrylate, ethyleneoxide-modified hexahydrophthalic acid di(meth)acrylate, tricyclodecane dimethanol(meth)acrylate, neopentylglycol-modified trimethylpropane di(meth)acrylate, adamantane di(meth)acrylate, or 9,9-bis[4-(2-acryloyloxyethoxy)phenyl]fluorene; trifunctional acrylates such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate, or tris(meth)acryloxyethylisocyanurate; tetrafunctional acrylates such as diglycerin tetra(meth)acrylate or pentaerythritol tetra(meth)acrylate; pentafunctional acrylates such as propionic acid-modified dipentaerythritol penta (meth)acrylate; and hexafunctional acrylates such as dipentaerythritol hexa(meth)acrylate, caprolactone-modified dipentaerythritol hexa(meth)acrylate, or urethane (meth) acrylate (e.g. a reaction product of an isocyanate monomer and trimethylolpropane tri(meth)acrylate). In some cases, a photocurable oligomer known in the art, for example, urethane acrylate, polycarbonate acrylate, polyester acrylate, polyether acrylate or epoxy acrylate, may also be used.

The multifunctional acrylate may be used alone or in combination of at least two thereof. It is preferable that the acrylate has a molecular weight of less than 1000 and at least trifunctional acrylate be used for durability, but the present invention is not limited thereto.

It is preferable that the multifunctional acrylate have a ring structure in the backbone structure. Due to the use of such an acrylate, the contraction or expansion of the polarizer may be effectively inhibited, and a light leakage prevention effect may be improved. The ring structure included in the multifunctional acrylate may be any one of carbocyclic or heterocyclic, or monocyclic or polycyclic structures. Examples of the multifunctional acrylates including a ring structure may include, but are not limited to, hexafunctional acrylates such as a monomer having an isocyanurate structure (for example, tris(meth)acryloxy ethyl isocyanurate), and isocyanate-modified urethane (meth)acrylate (e.g., a reaction product of isocyanate monomer and trimethylolpropane tri(meth)acrylate, etc.).

The multifunctional acrylate in the pressure-sensitive adhesive layer may be present in an amount of 20 to 200 parts by weight with respect to 100 parts by weight of the acryl resin, and thus may more effectively control the tensile modulus of the pressure-sensitive adhesive layer and maintain excellent durability.

In addition, the pressure-sensitive adhesive layer may further include a silane coupling agent. The silane coupling agent functions to increase cohesion and adhesion stability of the pressure-sensitive adhesive, thereby improving heat and moisture resistance, and also improve adhesion reliability even when the pressure-sensitive adhesive is left for a long time under severe conditions. Examples of the silane coupling agents may include γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxy silane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanatopropyl triethoxy silane, γ-acetoacetatepropyl trimethoxysilane, γ-acetoacetatepropyl triethoxy silane, β-cyanoacetyl trimethoxy silane, β-cyanoacetyl triethoxy silane, and acetoxyacetotrimethoxy silane, which may be used alone or in combination of at least two thereof. The present invention may use, but is not limited to, a silane-based coupling agent having an acetoacetate group or β-cyanoacetyl group. In the pressure-sensitive adhesive layer, the silane coupling agent is present in an amount of 0.01 to 5 parts by weight, preferably, 0.01 to 1 parts by weight with respect to 100 parts by weight of the acryl resin, and thus may effectively maintain pressure-sensitive adhesion and durability.

The pressure-sensitive adhesive layer may further include a tackifying resin. As the tackifying resin, a hydrocarbon-based resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin or polymerized rosin ester resin may be used alone or in combination of at least two thereof. The tackifying resin may be present in an amount of 1 to 100 parts by weight with respect to 100 parts by weight of the acryl resin.

The pressure-sensitive adhesive layer may further include at least one additive selected from the group consisting of an epoxy resin, a curing agent, a UV stabilizer, an antioxidant, a colorant, a reinforcing agent, a filler, an antifoaming agent, a surfactant, and a plasticizer without affecting the effect of the present invention.

A method of forming such a pressure-sensitive adhesive layer is not particularly limited. In one example, the pressure-sensitive adhesive layer may be formed by preparing an adhesive composition by blending the above-mentioned components, coating the resulting composition on the polarizer or a suitable process substrate using conventional means such as a bar coater or a comma coater, and curing the resulting composition. Also, the method of curing the pressure-sensitive adhesive composition is not particularly limited. For example, the adhesive composition may be cured by sequentially or simultaneously performing a process of aging the composition at a suitable temperature for the crosslinking reaction of the acryl polymer with the multifunctional crosslinking agent and a process of irradiating electromagnetic waves to enable the polymerization of the multifunctional acrylate. Here, the irradiation of the electromagnetic waves may be performed, for example, using means such as a high pressure mercury lamp, an electrodeless lamp, or a xenon lamp. In addition, the conditions for irradiating electromagnetic waves are not particularly limited, as long as they can be controlled for the polymerization of the multifunctional acrylate to be suitably performed without degrading general physical properties. For example, by controlling the luminance in a range of 50 to 2000 $mW/cm^2$, and the amount of light in a range of 10 to 1000 $mJ/cm^2$, the irradiation may be performed for an appropriate time.

Meanwhile, in consideration of the efficiency of the curing process according to the irradiation of the electromagnetic waves, a photoinitiator may be included in the pressure-sensitive adhesive composition. As the photoinitiator, any that can produce a radical by the irradiation of the electromagnetic waves and initiate the curing reaction may be used without limitation. Examples of the photoinitiators may include, but are not limited to, benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylantraquinone, 2-ethylantraquinone, 2-t-butylantraquinone, 2-aminoantraquinone, 2-methylthioxanthone, 2-ethylthioxanthone, 2-chlorothioxanthone, 2,4-dimethylthioxanthone, 2,4-diethylxanthone, benzyldimethylketal, acetophenone dimethylketal, p-dimethylamino benzoic acid ester, oligo[2-hydroxy-2-methyl-1-[4-(1-methylvinyl)phenyl]propanone] and 2,4,6-trimethyl-benzoyl-diphenyl-phosphineoxide, which may be used alone or in combination of at least two thereof.

The photoinitiator may be present in an amount of 0.2 to 20 parts by weight, preferably 0.2 to 10 parts by weight, and more preferably 0.2 to 5 parts by weight with respect to 100 parts by weight of the acryl resin. The photoinitiator may be present in an amount of 0.2 to 20 parts by weight with respect to 100 parts by weight of the multifunctional acrylate. The reaction of the multifunctional acrylate may be effectively induced through the controls described above, and the degradation of the physical properties of the pressure-sensitive adhesive due to the remaining components after curing may be prevented.

In the present invention, the pressure-sensitive adhesive layer may be formed using a thermocurable or room temperature curable pressure-sensitive adhesive composition. In this case, the pressure-sensitive adhesive layer may include an acryl resin crosslinked by a multifunctional crosslinking agent.

As the acryl resin, the same kind of resin as used in the above-mentioned photocurable composition may be used. In one example, the acryl resin may be a polymer including 80 to 99.9 parts by weight of a (meth)acrylic acid ester-based monomer and 0.1 to 20 parts by weight of a crosslinkable monomer as polymerization units. Specific kinds of the (meth)acrylic acid ester-based monomer and the crosslinkable monomer or a method of preparing a polymer may be as described above. In addition, the polymer may also include the functional monomer of Formula 1.

Also, as a multifunctional crosslinking agent crosslinking the acryl resin in the pressure-sensitive adhesive layer, an isocyanate crosslinking agent, an epoxy crosslinking agent, an aziridine crosslinking agent or a metal chelate crosslinking agent as described above may be used. Such a crosslinking agent may be present in a suitable content of 0.01 to 10 parts by weight, and preferably 0.01 to 5 parts by weight with respect to 100 parts by weight of the acryl resin in consideration of the tensile modulus, durability and cohesion of the pressure-sensitive adhesive layer.

A method of forming the pressure-sensitive adhesive layer may be similar to that of forming a photocurable pressure-sensitive adhesive described above except that the curing process caused by the irradiation of electromagnetic waves is not performed. In other words, the pressure-sensitive adhesive layer may be formed by preparing a pressure-sensitive adhesive composition by suitably blending necessary components, coating the composition on a suitable substrate, and curing the composition. When necessary, the thermocurable pressure-sensitive adhesive composition may also include at least one additive selected from the group consisting of a silane coupling agent, a tackifying resin, an epoxy resin, a curing agent, a UV stabilizer, an antioxidant, a colorant, a reinforcing agent, a filler, an antifoaming agent, a surfactant and a plasticizer.

In the present invention, when the pressure-sensitive adhesive layer constitutes a multi-layered structure having at least two layers, the multi-layered pressure-sensitive adhesive layer may be formed using a suitable one of the above-mentioned pressure-sensitive adhesive layers, the pressure-sensitive adhesive layers being formed of the same or different kinds. However, as described above, a pressure-sensitive adhesive disposed on a polarizer and attached thereto is preferably to be formed from a photocurable pressure-sensitive adhesive composition.

A polarizer of the present invention may further include a protective film attached to one surface of the polarizer, specifically, the surface opposite to that to which the pressure-sensitive adhesive layer is attached. Examples of the protective film may include, but are not limited to, a cellulose-based film such as a TAC film; a polyester-based film such as a poly(ethylene terephthalate) film (PET film); a polycarbonate-based film; a polyethersulfone-based film; an acryl-based film and/or a polyolefin-based film such as a polyethylene film, a polypropylene film, a polyolefin film having a cyclic or norbornene structure or an ethylene-propylene copolymer film. The protective film may be attached to the polarizer by means of the above-mentioned adhesive layer.

The polarizing plate may further include a releasing film attached to a bottom of the pressure-sensitive adhesive layer. A conventional component in the art may be employed as the releasing film.

When necessary, the polarizing plate may further include at least one functional layer selected from the group consisting of an anti-reflection layer, an anti-glare layer, a retardation plate, a wide viewing angle compensating film and a brightness enhancement film.

The present invention relates to a liquid crystal display device including a liquid crystal panel and a polarizing plate according to the present invention attached to one or both surfaces of the liquid crystal panel.

The kind of the liquid crystal panel included in the LCD device is not particularly limited. For example, all kinds of known panels including, but not limited to, a passive matrix panel such as a twisted nematic (TN), super twisted nematic (STN), ferroelectric (F) or polymer dispersed (PD) panel; an active matrix panel such as a two-terminal or three-terminal panel; an in-plane switching (IPS) panel; and a vertical alignment (VA) panel may be used.

The kinds of other components comprising the LCD device, for example, upper and lower substrates (e.g., a color filter substrate or an array substrate), are not particularly limited either, and any components known in the art may be employed without limitation.

Advantageous Effects

According to the present invention, a polarizing plate which has a lighter weight and a thinner thickness, and also has excellent physical properties such as durability, water resistance, workability, adhesion and light leakage preventability; and a liquid crystal display device including the same can be provided.

MODE FOR INVENTION

Figure 1:
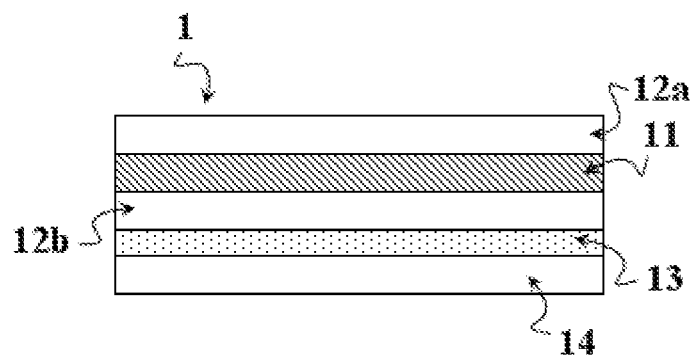
FIG. 1 is a diagram illustrating a structure of a conventional polarizing plate.
Figure 2:
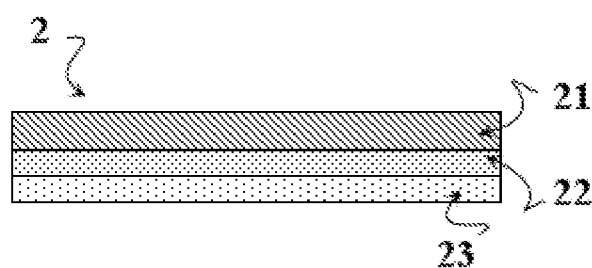
FIG. 2 is a diagram illustrating an exemplary polarizing plate of the present invention.
Figure 3:
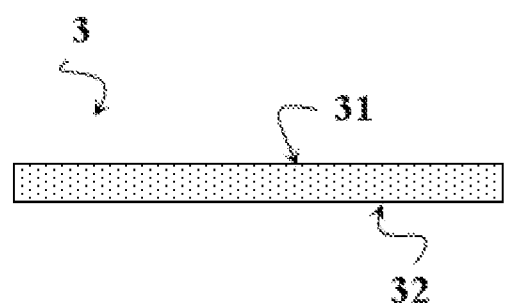
FIGS. 3 and 4 are diagrams illustrating configurations of an exemplary pressure-sensitive adhesive layer of the present invention.
Figure 4:
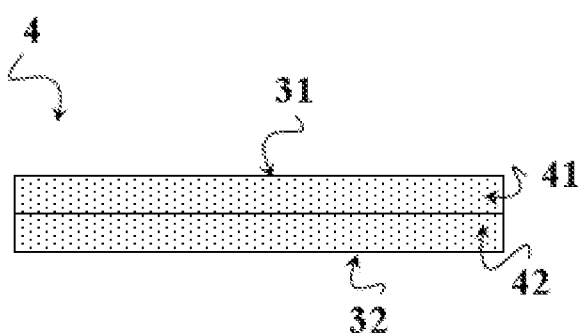

Hereinafter, the present invention will be described with reference to examples and comparative examples in detail. However, the present invention is not limited to these examples.

Preparation Example 1. Preparation of Acryl Resin (A)

63 parts by weight of n-butyl acrylate (n-BA), 2 parts by weight of 2-hydroxyethyl methacrylate (2-HEA) and 35 parts by weight of 2-methoxyethyl acrylate were put into a 1 L reactor equipped with a cooling device to reflux nitrogen gas and facilitate temperature control. Subsequently, 0.04 parts by weight of n-dodecyl mercaptan (n-DDM) was put into the reactor as a molecular weight controller with respect to 100 parts by weight of a monomer, and ethyl acetate (EAc) was put as a solvent into the reactor, which was purged with the nitrogen gas for 60 minutes to remove oxygen. Afterwards, the temperature was maintained at 64° C., 0.05 parts by weight of azobisisobutyronitrile (AIBN), as a reaction initiator, was put into the reactor with respect to 100 parts by weight of the monomer, and the reaction was carried out for 7 hours. After the reaction, the reaction product was diluted with ethyl acetate, and thus an acryl resin (A) having a weight average molecular weight of 550000 was prepared.

Preparation Example 2. Preparation of Acryl Resin (B)

99 parts by weight of n-BA and 1 part by weight of 2-HEA were put into a 1 L reactor equipped with a cooling device to reflux nitrogen gas and facilitate temperature control. Subsequently, EAc was put as a solvent into the reactor, which was purged with the nitrogen gas for 60 minutes to remove oxygen and then the temperature was maintained at 64° C. After the mixture was homogenized, 0.05 parts by weight of AIBN, as a reaction initiator, was put into the reactor with respect to 100 parts by weight of the monomer, and the reaction was carried out for 7 hours. After the reaction, the reaction product was diluted with ethyl acetate, and thus an acryl polymer (B) having a weight average molecular weight of 1800000 was prepared.

Example 1

Formation of First Pressure-Sensitive Adhesive Layer

A first pressure-sensitive adhesive composition was prepared by blending 100 parts by weight of an acryl resin (A), 80 parts by weight of a multifunctional acrylate, pentaerythritol triacrylate, 3 parts by weight of a photoinitiator, 2-hydroxy-2-methylphenylpropane-1-one, 5 parts by weight of a crosslinking agent (TDI-based isocyanate, Coronate L, Nippon Polyurethane Industry (Japan)), and 0.1 parts by weight of a silane coupling agent (KBM-403, Shin-Etsu (Japan), γ-glycidoxypropyltrimethoxy silane), diluting the resulting product to have a solid concentration of 35 wt %, and homogeneously mixing the resulting solution. Subsequently, the prepared pressure-sensitive adhesive composition was coated on a releasing-treated surface of a poly(ethylene terephthalate) (PET) film (thickness: 38 μM, MRF-38, Mitsubishi) subjected to releasing treatment using a silicon compound to have a thickness of 25 μM after drying, and the resulting film was dried in an oven at 110° C. for 3 minutes. Then, a releasing-treated surface of the releasing-treated PET film (thickness: 38 μm, MRF-38, Mitsubishi) was further laminated on the dried coating layer, and UV rays were irradiated under the following conditions, thereby forming a first pressure-sensitive adhesive layer. A tensile modulus (at 25° C.) of the prepared first pressure-sensitive adhesive layer was 400 MPa. Herein, the tensile modulus was measured according to the following method.

<Conditions for UV Irradiation>

Apparatus for UV Irradiation: High Pressure Mercury Lamp

Irradiation Conditions:
Luminance: 600 mW/cm$^2$
Amount of Light: 150 mJ/cm$^2$
Formation of Second Pressure-Sensitive Adhesive Layer
A second pressure-sensitive adhesive composition was prepared by blending 100 parts by weight of an acryl resin (B), 15 parts by weight of a multifunctional acrylate, pentaerythritol triacrylate, 3 parts by weight of a photoinitiator, 2-hydroxy-2-methylphenylpropane-1-one, 0.5 parts by weight of a crosslinking agent (TDI-based isocyanate, Coronate L, Nippon Polyurethane Industry (Japan)) and 0.1 parts by weight of a silane coupling agent (KBM-403, Shin-Etsu (Japan), γ-glycidoxypropyltrimethoxy silane), diluting the resulting product to have a solid concentration of 13 wt %, and homogeneously mixing the resulting solution. Subsequently, the prepared pressure-sensitive adhesive composition was coated on a releasing-treated surface of a poly(ethylene terephthalate) (PET) film (thickness: 38 μm, MRF-38, Mitsubishi) subjected to releasing treatment using a silicon compound to have a thickness of 25 μM after drying, and the resulting film was dried in an oven at 110° C. for 3 minutes. Then, a releasing-treated surface of the releasing-treated PET film (thickness: 38 μm, MRF-38, Mitsubishi) was further laminated on the dried coating layer, and UV rays were irradiated under the following conditions, thereby forming a second pressure-sensitive adhesive layer. A tensile modulus (at 25° C.) of the prepared second pressure-sensitive adhesive layer was 0.2 MPa.

<Conditions for UV Irradiation>

Apparatus for UV Irradiation: High Pressure Mercury Lamp

Irradiation Conditions:
Luminance: 600 mW/cm$^2$
Amount of Light: 150 mJ/cm$^2$
Formation of Polarizing Plate
A double-layered pressure-sensitive adhesive layer was formed by laminating the first and second pressure-sensitive adhesive layers formed above using a laminator, and a polarizing plate was formed using the pressure-sensitive adhesive layer. A sequence of forming the polarizing plate was as follows. First, a polarizer was formed by stretching a polyvinyl alcohol-based resin film, staining the film with iodine, and treating the resulting film with a boric acid aqueous solution. Subsequently, a 60 μm-thick triacetyl cellulose (TAC) film was attached to one surface of the polarizer using a water-based polyvinyl alcohol-based adhesive. Afterwards, a water-based polyvinyl alcohol-based adhesive composition was coated on a surface of the polyvinyl alcohol-based polarizer which the TAC film was not attached, to have a thickness of 400 nm after drying. As the water-based polyvinyl alcohol-based adhesive composition, an adhesive composition generally used to attach the TAC protective film to the polarizer was used. Then, a polarizing plate was formed by laminating the formed pressure-sensitive adhesive layer having the double-layered structure on the coated surface of the adhesive composition, and drying the adhesive composition to attach the pressure-sensitive adhesive layer to the polarizer. In this step, the first pressure-sensitive adhesive layer was designed to be disposed on the polyvinyl alcohol-based polarizer (the structure of the polarizing plate: TAC film→water-based polyvinylalcohol-based adhesive→polarizer→water-based polyvinyl alcohol-based adhesive→first pressure-sensitive adhesive layer→second pressure-sensitive adhesive layer→PET releasing film).

Example 2

Except that a coating thickness of water-based polyvinyl alcohol-based adhesive composition for attaching a pressure-sensitive adhesive layer to a polarizer was controlled for the adhesive layer to have a thickness of 100 nm after drying, a polarizing plate was formed by the same method as described in Example 1.

Example 3

Except that, in formation of a pressure-sensitive adhesive layer, a second pressure-sensitive adhesive layer was controlled to have a thickness of 23 μm, and a coating thickness of water-based polyvinyl alcohol-based adhesive composition attached to a polarizer was controlled for the adhesive layer to have a thickness of 50 nm after drying, a polarizing plate was formed by the same method as described in Example 1.

Example 4

Except that, in formation of a pressure-sensitive adhesive layer, a second pressure-sensitive adhesive layer was controlled to have a thickness of 23 μm, and a coating thickness of water-based polyvinyl alcohol-based adhesive composition attached to a polarizer was controlled for the adhesive layer to have a thickness of 20 nm after drying, a polarizing plate was formed by the same method as described in Example 1.

Comparative Example 1

Except that a coating thickness of water-based polyvinyl alcohol-based adhesive composition for attaching a pressure-sensitive adhesive layer to a polarizer was controlled for the adhesive layer to have a thickness of 8 nm after drying, a polarizing plate was formed by the same method as described in Example 1.

Comparative Example 2

Except that, in a step of attaching a pressure-sensitive adhesive layer to a polarizer, the pressure-sensitive adhesive layer was directly attached to the polarizer without using a water-based polyvinyl alcohol-based adhesive, a polarizing plate was formed by the same method as described in Example 1 (the structure of the polarizing plate: TAC film→water-based polyvinylalcohol-based adhesive→polarizer→first pressure-sensitive adhesive layer→second pressure-sensitive adhesive layer→PET releasing film).

Comparative Example 3

Except that a coating thickness of water-based polyvinyl alcohol-based adhesive composition for attaching a pressure-sensitive adhesive layer to a polarizer was controlled for the adhesive layer to have a thickness of 100 nm after drying, and in formation of a pressure-sensitive adhesive layer, a first pressure-sensitive adhesive layer was designed to have a thickness of 5 μm, and a second pressure-sensitive adhesive layer was designed to have a thickness of 3 μm, a polarizing plate was formed by the same method as described in Example 1.

<Evaluation of Physical Properties>
1. Evaluation of Tensile Modulus

Herein, the tensile modulus of the adhesive was measured by a tensile stress-strain test according to a method defined in ASTM D638, or when it was difficult to directly measure the tensile modulus, a storage modulus was measured by the following method and then converted by the following formula. Specifically, a sample having a stacked structure of a PET releasing film (thickness: 38 μm, MRF-38), a pressure-sensitive adhesive layer and a PET releasing film (thickness: 38 μm, MRF-38), formed in Examples or Comparative Examples, was cut into a dog bone-type specimen in a size of 7 cm (length)×1 cm (width). Both ends of the specimen were fixed with tensile test jigs, and a tensile modulus was measured according to ASTM D638. The conditions for measuring the tensile modulus were as follows.

<Conditions for Measuring Tensile Modulus>
Measuring Apparatus: Universal Testing Machine (UTM)
Equipment Model: Zwick Roell Z010, Instron
Measurement Conditions:
Load Cell: 500 N
Tensile Speed: 3 mm/sec
<Measurement of Storage Modulus and Conversion into Tensile Modulus>

A pressure-sensitive adhesive layer was cut in a size of 15 cm×25 cm×25 μM (width×length×thickness), and the adhesive layer cut as described above were stacked to be 5 layers. Subsequently, the stacked adhesive layers were cut in a circle having a diameter of 8 mm, and pressed using glasses overnight to improve wettability at an interface between layers, thereby removing air bubbles generated during stacking. As a result, a specimen was prepared. Subsequently, the specimen was placed on a parallel plate, and a gap was adjusted. Then, a zero point of Normal & Torque was adjusted, the stability of a normal force was checked, the storage modulus was measured under the following conditions, and the tensile modulus was calculated according to the following conversion formula.

Measurement Apparatus and Measuring Conditions
Measurement Apparatus: ARES-RDA, TA Instruments Inc. with forced convection oven
Measuring Conditions:
Geometry: 8 mm parallel plate
Gap: around 1 mm
Test Type: dynamic strain frequency sweep
Strain=10.0 [%], temperature: 30° C.
Initial Frequency: 0.4 rad/s, final frequency: 100 rad/s
<Conversion Formula>

$$E=3G$$

In the above formula, E is a tensile modulus, and G is a storage modulus.

2. Evaluation of Durability and Reliability

A specimen formed by cutting a polarizing plate previously formed in a size of 180 mm×250 mm (width×length) was attached to a commercially available 19-inch panel using a laminator, thereby preparing a sample. A pressure applied during attachment was approximately 5 kg/cm², and works were carried out in a clean room to avoid the generation of air bubbles or foreign materials at an interface. Afterwards, the panel was pressed in an autoclave (50° C., pressure of 5 atm) for approximately 30 minutes, and stored under a constant temperature and humidity (23° C., 50% relative humidity) for 24 hours. The durability against humidity and heat resistance of the sample was then determined by observing whether air bubbles or peeling were generated at an adhesive interface after the sample was maintained for 100 hours under conditions including a temperature of 60° C. and a relative humidity of 90%. Furthermore, the durability against heat resistance was determined by observing whether air bubbles or peeling were generated at an adhesive interface after the sample was maintained for 100 hours at a temperature of 90° C. Samples formed just before measurement of the durability against humidity and heat resistance or heat resistance were left for 24 hours at room temperature, and then evaluated. Evaluation conditions were as follows:

<Criteria for Evaluation of Durability and Reliability>
○: No air bubbles and/or peeling were generated.
Δ: Air bubbles and/or peeling were somewhat generated.
x: Air bubbles and/or peeling were considerably generated.

3. Evaluation of Water Resistance

Polarizing plates formed in Examples and Comparative Examples were cut in a size of 180 mm×130 mm (width× length), thereby forming specimens. Each specimen was attached to a glass substrate (a soda lime glass), thereby forming a sample. Subsequently, the formed sample was put into water at 60° C., kept for 24 hours, and then taken out to observe whether air bubbles or peeling were generated. The water resistance was evaluated according to the following criteria. The sample formed right before the evaluation of the water resistance was left for 24 hours at room temperature, and evaluated. Evaluation conditions were as follows.

<Criteria for Evaluation of Water Resistance>
○: No air bubbles and/or peeling were generated at an interface between an adhesive layer and a pressure-sensitive adhesive layer or at an interface between a polarizer and a pressure-sensitive adhesive layer.
Δ: Air bubbles and/or peeling were somewhat generated at an interface between an adhesive layer and a pressure-sensitive adhesive layer or at an interface between a polarizer and a pressure-sensitive adhesive layer.
x: Air bubbles and/or peeling were considerably generated at an interface between an adhesive layer and a pressure-sensitive adhesive layer or at an interface between a polarizer and a pressure-sensitive adhesive layer.

4. Evaluation of Weight Average Molecular Weight and Molecular Weight Distribution The weight average molecular weight and the molecular weight distribution of an acryl polymer were measured using a GPC under the following conditions. To draw a calibration curve, standard polystyrene of an Agilent system was used, and measurement results were converted.

<Conditions for Measuring Weight Average Molecular Weight>
Measuring Apparatus: Agilent GPC (Agilent 1200 series, USA)
Column: two connected PL mixed B
Column Temperature: 40° C.
Eluent: Tetrahydrofuran
Flow Rate: 1.0 mL/min
Concentration: ~2 mg/mL (100 μL injection)

The measurement results are summarized and shown in Table 1.

TABLE 1

| | Examples | | | | Comparative Examples | | |
|---|---|---|---|---|---|---|---|
| | 1 | 2 | 3 | 4 | 1 | 2 | 3 |
| Presence of Adhesive Layer | ○ | ○ | ○ | ○ | ○ | X | ○ |
| Thickness of Adhesive Layer (nm) | 400 | 100 | 50 | 20 | 8 | — | 100 |
| Thickness of Pressure-Sensitive Adhesive Layer (μm) | 50 | 50 | 48 | 48 | 50 | 50 | 8 |
| Durability Against Heat Resistance | ○ | ○ | ○ | ○ | ○ | ○ | X |

TABLE 1-continued

| | Examples | | | | Comparative Examples | | |
|---|---|---|---|---|---|---|---|
| | 1 | 2 | 3 | 4 | 1 | 2 | 3 |
| Durability Against Humidity and Heat Resistance | ○ | ○ | ○ | ○ | Δ | ○ | Δ |
| Water Resistance | ○ | ○ | ○ | ○ | X | X | ○ |

DESCRIPTION OF REFERENCES 1,2: a polarizing plate
10, 13, 22: a pressure sensitive adhesive layer
11, 21: a polarizer
12a, 12b, 23: a protect film
10A: a first surface
10B: a second surface
20: a releasing PET film

The invention claimed is:

1. A polarizing plate, comprising:
a polarizer;
an adhesive layer directly attached to at least one surface of the polarizer and having a thickness of 20 to 400 nm; and
an acrylic pressure-sensitive adhesive layer that has a thickness of 10 to 50 μm, and has a first surface directly attached to the adhesive layer and a second surface, which is a pressure-sensitive adhesive surface for attaching the polarizing plate to a liquid crystal panel, opposite to the first surface, in which the first surface has a higher tensile modulus than the second surface thereof,
wherein the first surface has a tensile modulus at 25° C. of 100 to 500 MPa and the second surface has a tensile modulus at 25° C. of 0.02 to 0.3 MPa,
wherein at least one surface of the polarizer does not have a protective film, the adhesive layer is attached to a surface of the polarizer which does not have a protective film,
wherein the acrylic pressure-sensitive adhesive layer includes an interpenetrating polymer network comprising: a crosslinking structure having an acryl resin crosslinked by a multifunctional crosslinking agent; and a crosslinking structure having a polymerized multifunctional acrylate,
wherein the acrylic pressure-sensitive adhesive layer includes 20 to 200 parts by weight of the multifunctional acrylate with respect to 100 parts by weight of the acryl resin,
wherein the amount of the multifunctional acrylate included in the first surface is greater than the amount of the multifunctional acrylate included in the second surface, and
wherein the acryl resin includes a (meth)acrylic acid ester-based monomer and a monomer of Formula 1, as polymerization units:

[Formula 1]

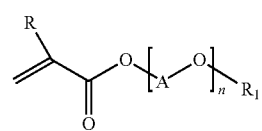

wherein, R is a hydrogen or an alkyl group, A is an alkylene, $R_1$ is an alkyl or aryl group, and n is a number from 1 to 6.

2. The polarizing plate according to claim 1, wherein the adhesive layer includes at least one selected from the group consisting of a polyvinyl alcohol-based adhesive; an acryl-based adhesive; a vinyl acetate-based adhesive; a urethane-based adhesive; a polyester-based adhesive; a polyolefin-based adhesive; a polyvinyl alkylether-based adhesive; a rubber-based adhesive; a vinylchloride-vinylacetate-based adhesive; a styrene-butadiene-styrene adhesive; a hydrogenated styrene-butadiene-styrene-based adhesive; an ethylene-based adhesive; and an acrylic acid ester-based adhesive.

3. The polarizing plate according to claim 1, wherein the adhesive layer includes a thermocurable adhesive composition, a room temperature curable adhesive composition, a moisture curable adhesive composition, or a photocurable adhesive composition in a cured state.

4. The polarizing plate according to claim 1, wherein the adhesive layer includes a water-based polyvinylalcohol-based adhesive composition, a non-solvent-type acryl adhesive composition, or a non-solvent-type vinyl acetate-based adhesive composition in a cured state.

5. The polarizing plate according to claim 1, further comprising a protective film attached to a surface of the polarizer opposite to that to which the adhesive layer is attached.

6. The polarizing plate according to claim 5, wherein the protective film is a cellulose film, a polyester film, a polycarbonate film, a polyethersulfone film, an acryl film or a polyolefin film.

7. The polarizing plate according to claim 1, further comprising at least one selected from the group consisting of an anti-reflection layer, an anti-glare layer, a retardation plate, a wide viewing angle compensating film and a brightness enhancement film.

8. A liquid crystal display device, comprising:
a liquid crystal panel; and
a polarizing plate according to claim 1 attached to one or both surfaces of the liquid crystal panel.

9. The liquid crystal display device according to claim 8, wherein the liquid crystal panel is a passive matrix panel, an active matrix panel, an in plane switching panel or a vertical alignment panel.

* * * * *